March 4, 1952
C. A. AIREY
2,587,675
AUTOMATIC FISHING APPARATUS
Filed July 15, 1949
2 SHEETS—SHEET 1
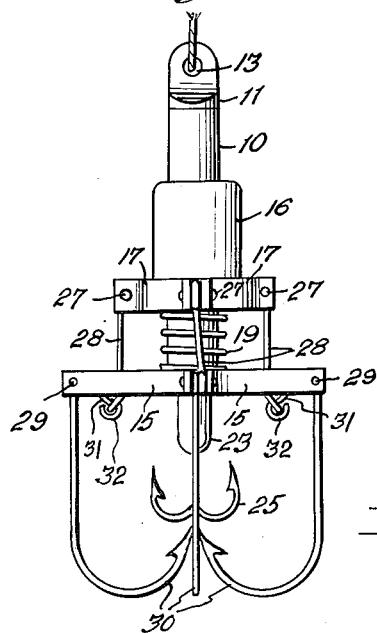
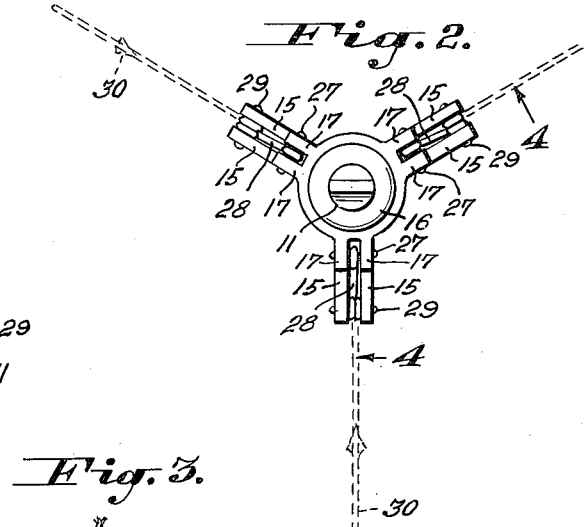
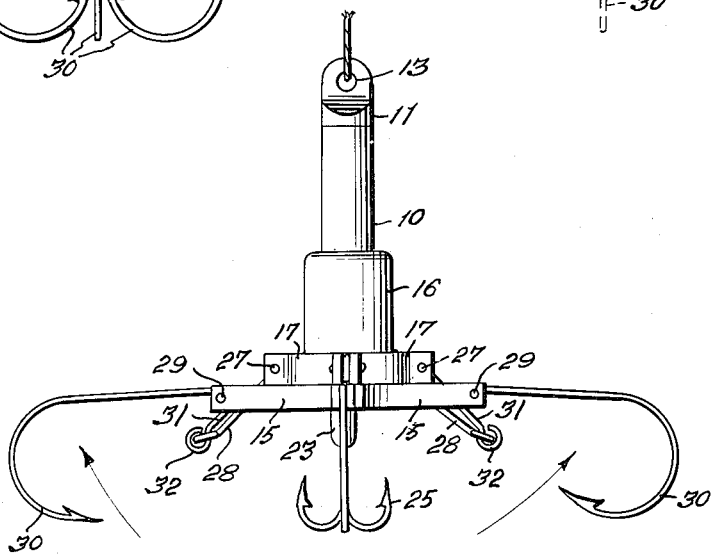
Inventor
Charles A. Airey
By Patrick D. Beavers
Attorney March 4, 1952 — C. A. AIREY — 2,587,675
AUTOMATIC FISHING APPARATUS
Filed July 15, 1949 — 2 SHEETS—SHEET 2
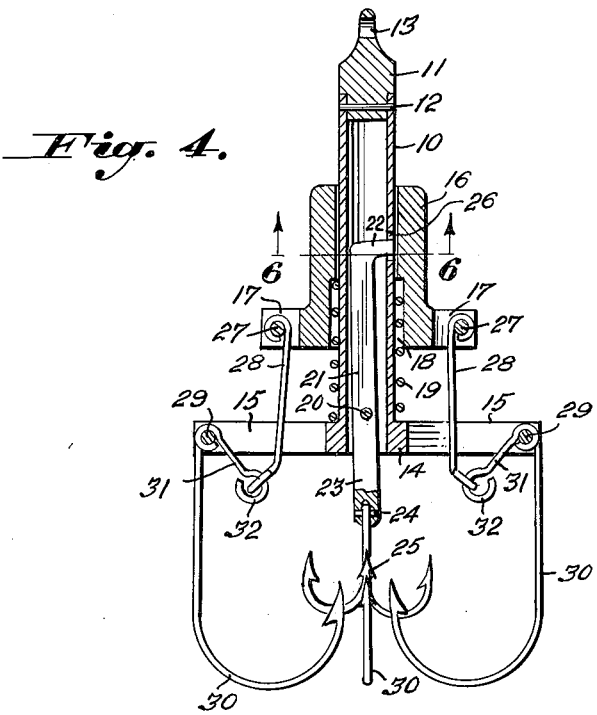
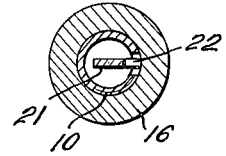
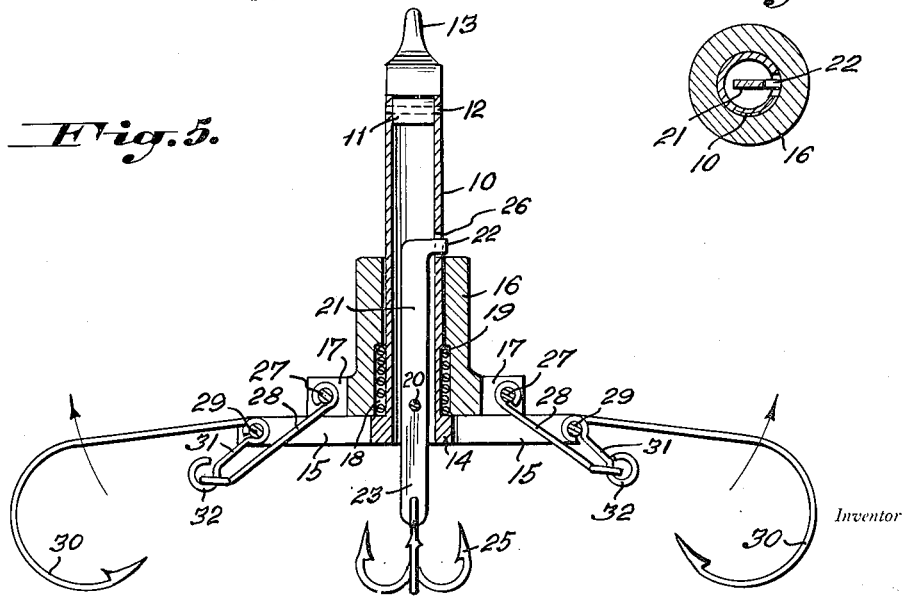

Patented Mar. 4, 1952

2,587,675

UNITED STATES PATENT OFFICE 2,587,675

AUTOMATIC FISHING APPARATUS

Charles A. Airey, Alliance, Ohio

Application July 15, 1949, Serial No. 104,974

1 Claim. (Cl. 43—89)

The present invention relates to an automatic fishing apparatus and it consists in the combinations, constructions and arrangements of pats herein described and claimed.

Generally there is provided a hollow cylindrical member upon which is reciprocally mounted a collar and inside of which is pivotally mounted an arm the inner end of which is formed as a latch member which is adapted to latch with the inner end of the collar and the outer end of which has connected therewith a plurality of outstanding bait hooks. A spider is affixed to the outer end of the cylindrical member and has pivotally mounted thereon a plurality of relatively large hooks having bell-crank arms which are connected with the collar by means of links. A spring is interposed between the collar and the spider to normally urge the large hooks to closed position. The large hooks may be moved to an extended outward position by forcing the collar toward the spider and latching the latch member with the inner end of the collar. A pull by a fish upon the bait holding hooks will cause the latch to release the collar and the spring to violently bring together the larger hooks to securely entrap the head of the fish therein.

It is accordingly an object of the invention to provide a device of the character set forth which is wholly automatic in its operation.

Another object of the invention is the provision of an apparatus of the character set forth which is simple in construction, easy to operate and yet effective and efficient in use.

Another object of the invention is the provision, in an apparatus of the character set forth, of a novel latch mechanism forming a part of the invention.

A further object of the invention is the provision, in an apparatus of the character set forth, of novel means for violently bringing together a plurality of fish-engaging hooks forming a part of the invention.

A still further object of the invention is the provision of novel actuating means for movable hooks forming a part of the invention.

Other and further objects of the invention will become apparent from a reading of the following specification taken in conjunction with the drawings, in which:

Figure 1 is a side elevational view of an embodiment of the invention,

Figure 2 is a top plan view thereof,

Figure 3 is a view similar to Figure 1 but showing certain fish-engaging hooks forming a part of the apparatus in distended position, Figure 4 is a sectional view taken along line 4—4 of Figure 2, Figure 5 is a view similar to Figure 4 but showing the device with its fish-engaging hooks in distended position, Figure 6 is a sectional view taken along line 6—6 of Figure 4.

Referring more particularly to the drawings, there is shown therein a fishing apparatus comprising a hollow cylindrical member 10 having a plug 11 affixed in its inner end by means of a pin 12 or the like. An eye 13 is formed in the free end of the plug 11.

A collar 14 is integrally formed at the outer end of the member 10 and has extending outwardly therefrom arms 15 forming a spider.

An elongated collar 16 is slidably mounted on the cylindrical member 10 and is provided with arms 17 at its outer end which arms extend outwardly from the collar 16. The collar 16 is provided with a recess 18 which extends inwardly from its outer end and a compression spring 19 surrounds the cylindrical member 10 and bears against the inner end of the recess 18 and the collar 14.

Pivotally mounted upon a pin 20 which extends transversely through the member 10 adjacent the outer end thereof is an arm whose inner end 21 extends into the interior of the member 10 and has integrally formed at its inner extremity a laterally extending latch member 22. The outer portion 23 of the pivoted arm has affixed therein by means of a pin 24 or the like the inner end of an outwardly extending multiple bait hook 25. The latch member 22 is adapted to move laterally through an opening 26 formed in the side of the cylindrical member 10.

The arms 17, of which six are shown, are arranged in pairs as will be evident from an examination of Figure 2 of the drawings and a pin 27 interconnects each pair of arms 17 and has pivotally connected thereto one end of a link 28.

The arms 15 of which there are likewise six, are likewise arranged in pairs and each pair is interconnected by means of a pin 29 upon each of which is pivotally mounted an inwardly extending fish-engaging hook 30 each of which is provided with an integrally formed inwardly extending bell-crank arm 31 having an eye 32 at its free end which eye is connected with the outer end of a link 28 in each case.

In operation, it will be apparent that the bait hooks 25 are first baited in conventional manner after which the movable collar 16 is forced downwardly against the action of the spring 19 until the inner end of the collar 16 clears the opening 26 whereupon the latch 22 may be moved outwardly to engage the collar 16 by moving the outer portion 23 of the arm in a proper direction. This action will cause an outward movement of the links 28 and a corresponding outward movement of the bell-crank arms 31 and hence an outward movement of the fish-engaging hooks 30 so that the fish-engaging hooks will assume the position shown clearly in Figures 3 and 5 of the drawings. When a fish disturbs in any way the bait upon the bait hooks 25 it will cause the latch 22 to become disengaged from the collar 16 thereby allowing the compression spring 19 to move upwardly the collar 16 upon the cylindrical member 10 thus causing the links 28 and the bell-cranks 31 to move upwardly also. This action will cause a violent return of the fish-engaging hooks 30 to their normal inward position, as viewed in, for example, Figure 1, thereby engaging the head of the fish from three different positions and making it for all practical purposes impossible for the fish to escape.

While but one form of the invention has been shown and described herein, it will be readily apparent to those skilled in the art that many minor modifications may be made herein without departing from the spirit of the invention or the scope of the appended claim.

What is claimed is:

An apparatus of the character described comprising a centrally disposed hollow cylindrical member having an opening in one side thereof, a spider at the outer end of the cylindrical member, a plurality of inwardly directed outwardly swingable fish-engaging hooks pivoted to the outer ends of the spider, a collar slidable on the cylindrical member, a compression spring interposed between the spider and the collar, an elongated arm extending into the cylindrical member and substantially centrally pivoted thereto to said cylindrical member adjacent the outer end thereof, a latch formed integrally with the inner end of said arm and extending laterally through the opening in the side of said cylindrical member to engage the collar when the same is pressed against the spider against the action of the spring, bait hooks mounted at the outer end of said arm and means interconnecting the collar and the fish-engaging hooks whereby movement of the collar toward the spider distends said fish engaging hooks.

CHARLES A. AIREY.

REFERENCES CITED

The following references are of record in the file of this patent:

UNITED STATES PATENTS

| Number | Name | Date |
|---|---|---|
| 80,151 | Dennett | July 21, 1868 |
| 584,833 | Thompson | June 22, 1897 |
| 1,763,921 | Buford | June 17, 1930 |
| 1,817,185 | Goodrum | Aug. 4, 1931 |
| 1,829,602 | Muhvic | Oct. 27, 1931 |